(12) United States Patent
Kauss et al.

(10) Patent No.: US 6,321,483 B1
(45) Date of Patent: *Nov. 27, 2001

(54) FLY FISHING LINE AND METHOD FOR MANUFACTURING OF SAME

(75) Inventors: Del A. Kauss, St. Paul, MN (US); Bruce W. Richards, Midland, MI (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,798

(22) Filed: Apr. 20, 1998

(51) Int. Cl.$^7$ .................................................... A01K 91/12
(52) U.S. Cl. ........................................... 43/44.98; 428/364
(58) Field of Search ............................. 43/44.98; 428/364

(56) References Cited

U.S. PATENT DOCUMENTS

| | | | |
|---|---|---|---|
| 3,043,045 | | 7/1962 | Martuch ............................... 43/44.98 |
| 3,523,034 | * | 8/1970 | Howald ................................. 428/389 |
| 3,748,168 | * | 7/1973 | Schmidt et al. ..................... 428/372 |
| 3,868,785 | * | 3/1975 | Foote ................................... 43/44.98 |
| 3,914,480 | * | 10/1975 | Lang ..................................... 428/395 |
| 3,936,335 | * | 2/1976 | Martuch ................................. 156/79 |
| 4,048,744 | | 9/1977 | Chandler ................................ 43/17.5 |
| 4,321,854 | * | 3/1982 | Foote et al. .............................. 87/6 |
| 4,386,132 | * | 5/1983 | Dille et al. ........................... 428/372 |
| 4,459,337 | * | 7/1984 | Hansen ................................. 428/395 |
| 4,606,144 | * | 8/1986 | Sasaki et al. ....................... 43/44.98 |
| 5,207,732 | | 5/1993 | Stark .................................... 43/44.98 |
| 5,296,292 | | 3/1994 | Butters ................................. 428/375 |
| 5,354,616 | * | 10/1994 | Fish, Jr. et al. ..................... 428/373 |
| 5,407,623 | * | 4/1995 | Zachariades et al. ............... 264/119 |
| 5,437,900 | | 8/1995 | Kuzowski ............................ 428/36.1 |
| 5,479,952 | * | 1/1996 | Zachariades et al. ............... 132/321 |
| 5,625,976 | | 5/1997 | Goodale ............................. 43/44.98 |

OTHER PUBLICATIONS

Brochure entitled Teflon MP 1100 Technical Information by DuPont.
Brochure entitled Airflow 7000 TS Traditional.

* cited by examiner

*Primary Examiner*—Peter M. Poon
*Assistant Examiner*—Son T. Nguyen
(74) *Attorney, Agent, or Firm*—Daniel R. Pastirik; James J. Trussell; Peter L. Olson

(57) ABSTRACT

A fly fishing line and a method for the manufacture of the line is described. The line comprises a core and an outer coating disposed around the core, the coating comprising polyvinyl chloride polymer, polytetrafluoroethylene and optionally polyacrylate derived from the polymerization of a polyfunctional polymerizable acrylate monomer. The method comprises coating a core with a plastisol comprising a polyvinyl chloride resin polytetrafluoroethylene, and optionally one or more of the foregoing monomers; exposing the plastisol to conditions providing formation of a polymer derived from the polyvinyl chloride resin and having polytetrafluoroethylene dispersed throughout the polymer.

17 Claims, No Drawings

FLY FISHING LINE AND METHOD FOR MANUFACTURING OF SAME

BACKGROUND OF THE INVENTION

The fly fishing industry continues to seek an improved balance of properties in fly fishing lines. Durability with low recoil memory on the one hand, and shootability on the other have been difficult to balance. Durability with low recoil memory are generally associated with line flexibility while shootability is generally associated with less flexible or more rigid lines. Lack of durability, associated with brittleness or hardness of the fly line, can result in cracking under the normal stresses encountered in casting a fly line. Shootability, on the other hand, is enhanced by a hard or stiff line. Shootability refers to the line "shooting" through the fly rod guides with less loss of force (through friction) than a more flexible line might encounter, with consequent increase in casting distance. Recoil memory refers to the tendency of a fly line to remain coiled that it assumes when disposed on the fly reel. Memory is generally considered to be directly related to the stiffness of the line.

Various constructions for fly fishing lines are known in the art.

U.S. Pat. No. 3,043,045, issued Jul. 10, 1962 to Martuch describes a fly fishing line comprising a nylon base core treated with a uniform priming coating of an adhesive material. A coating composition comprised of polyvinyl chloride in plasticizers is superimposed over the priming or adhesive coating.

U.S. Pat. No. 4,048,744, issued Sep. 20, 1977 to Chandler describes a fly fishing line having a buoyant tip section formed near the tip of the line. The fishing line is described as comprising a core member made of nylon, polyethylene or silk filaments treated with a priming coating of adhesive material over which is superimposed a coating composition comprising a dispersion of finely divided polyvinyl chloride in plasticizer.

United States Letters Patent No. 5,207,732, issued May 4, 1993 to Stark describes a fly fishing line comprising a core with a coating adherently bonded to the core. The coating is described as comprising a polyvinyl chloride resin with an in situ formed polymer to provide stiffness to the line. The polymer is derived from at least one polymerizable monomer including a polyfunctional acrylic monomer and an initiator. Inclusion of the acrylic polymer is said to improve the combination of properties of durability, shootability and recoil memory.

U.S. Pat. No. 5,296,292, issued Mar. 22, 1994 to Butters describes an elongated cylindrical tensile article made of one or more strands of a monofilament core surrounded by porous polytetrafluoroethylene (PTFE) which may be optionally coated or die sized on the outer surface for smoothness and/or abrasion resistance. The described article is said to be particularly useful for fly-casting lines for fishing.

U.S. Pat. No. 5,437,900, issued on Aug. 1, 1995 to Kuzowski describes porous expanded PTFE having a microstructure of nodes interconnected by fibrils where the surface of the material is modified to have increased hydrophobicity. The modified surface with increased hydrophobicity is said to possibly improve the flotation characteristics of fly fishing lines with an outer surface of porous expanded PTFE.

U.S. Pat. No. 5,625,976, issued on May 6, 1997 to Goodale also describes fly fishing lines and methods for their manufacture. The described lines include a core line portion and a coating comprising a copolymer of olefin, preferably ethylene, and acrylic material. The described lines are said to have a specific gravity of less than 1.0 without the necessity of adding microspheres or blowing agents and are said to be plasticizer free.

Commercially available fly lines manufactured by Fly Fishing Technology Ltd. In the United Kingdom and advertised under the trade designation AIRFLO 7000 TS are said to include a "glass smooth polymer coating" which includes PTFE and liquid lubricants. The fly lines are advertised as having a five year non-crack guarantee with "super floatability" due to the inclusion of PTFE into the outer coating of the line on all floating models. The outer coating of these lines is a urethane combined with the aforementioned PTFE.

The fly fishing industry has continued to experiment with fly line compositions in order to improve various properties such as shootability, durability, floatability and the like. Although progress has been made in this area, further improvements are sought to fulfill a long-felt need.

SUMMARY OF THE INVENTION

The present invention provides a fly fishing line and a method for the manufacture of such a line wherein the fly fishing line comprises a core of at least one filament material over which is coated a novel material to provide a fly line with enhanced properties. The fly line of the invention comprises:

a core; and an outer coating disposed around the core, the coating comprising polyvinyl chloride polymer and polytetrafluoroethylene.

Optionally, the outer coating may also include a polyacrylate as the polymerized reaction product of a polyfunctional polymerizable acrylate monomer. Preferably the polytetrafluoroethylene is in particulate form having an average particle size within the range from about 1 micrometers to about 15 micrometers and the outer coating is adhered to the core. The outer coating of the invention preferably will include additives such as plasticizers, lubricant, UV stabilizer, heat stabilizer and the like. Glass microspheres can also be incorporated in the outer coating to impart floatability to the finished line.

In another aspect of the invention, a method for the manufacture of the foregoing line is provided, the method comprising:

(a) coating a core with a plastisol comprising:
  (i) a polyvinyl chloride resin,
  (ii) polytetrafluoroethylene, and
(b) exposing the plastisol to conditions providing formation of a an outer coating derived from the polyvinyl chloride resin and having polytetrafluoroethylene dispersed throughout the outer coating.

The materials used in the foregoing method are all as described above. The method also preferably further comprises applying a primer to the core prior to coating the core with the plastisol to improve adhesion of the outer coating to the core surface.

Those skilled in the art will further appreciate the details of the present invention upon further consideration of the remainder of the disclosure including the detailed description of the preferred embodiment and the appended claims.

DETAILED DESCRIPTION OF THE PREFERRED EMBODIMENT

In its broadest aspect, the present invention provides a fishing fly line having a core and an outer coating disposed over the core. The core is comprised of one or more filaments over which is an outer coating comprised of a polyvinyl chloride resin and polytetrafluoroethylene (PTFE). The polyvinyl chloride resin and PTFE are coated over the core (e.g., braided nylon or polyester yarns or monofilaments) as a plastisol and subjected to sizing and heat processing to define a desired taper and to solidify the polyvinyl chloride. Optionally, a polymer derived at least in part from one or more polymerizable polyfunctional acrylic monomers may be included within the outer coating of the fly line and applied along with the polyvinyl chloride and PTFE in the aforementioned plastisol. An especially preferred acrylic monomer is trimethylolpropane trimethacrylate (TMPTMA) as disclosed in U.S. Pat. No. 5,207,732 to Stark, the disclosure of which is incorporated herein by reference.

The fly line of the invention may be a floating line having, for example, a specific gravity of 0.9 or less owing to the presence of microballoons or microspheres, gaseous filled cells or other known ingredients. Alternatively, the fly line may be a sinking line or the line may be made to include the combined properties of both a floating line and a sinking line. Additional known ingredients may be included within the outer coating. An initiator is preferably included within the plastisol to initiate polymerization of polyfunctional acrylic monomer when present.

As mentioned, the fly line includes a core line which typically extends through the central portion of the fly line, preferably along the entire length of the line. The preferred core generally comprises nylon, polypropylene, polyethylene or silk filaments in the form of a yarn, a braided monofilament, a single monofilament, or the like. Other core compositions may be apparent to those skilled in the art, and the invention is not limited to one core construction over another.

In the manufacture of the inventive line, a primer composition is normally coated over the aforementioned core to improve adhesion of the outermost coating to the surface of the core. Suitable primer compositions include that available under the trade designation "Vulcabond V-36" from Stabond Corporation and "Morthane CA-100" from Morton Thiokol, Inc. The former is a nitrile elastomer or rubber dissolved for application in methyl ethyl ketone. The Morthane CA-100 primer is a polyester bulk polymerized urethane elastomer with hydroxyl groups and this primer is also dissolved in methyl ethyl ketone for application to the fly line core.

The composition of the outer coating can vary as mentioned. Preferred compositions comprise polyvinyl chloride resin such as that known under the trade designation "Geon 121" available from BF Goodrich, for example. The outer coating of the fly line results from the application to the core of a plastisol comprising the aforementioned vinyl along with a combination of plasticizers, lubricants, heat stabilizers and ultraviolet (UV) stabilizers. Optionally, one or more polymerizable polyfunctional acrylic monomers may be included within the plastisol. The plastisol is applied to the core to provide the finished line with an outer coating that preferably covers the core along the entire length of the finished fly line. When the aforementioned acrylic monomer is included within the plastisol, the resulting coating will have an acrylic polymer incorporated therein. Suitable monomers will be compatible with other ingredients within the plastisol with consistent effects on the coating. Acceptable monomers include tetraethylene glycol diacrylate and 1,6 hexanediol dimethacrylate. An especially preferred acrylic monomer is trimethylolpropane trimethacrylate (TMPTMA) such as that commercially available from Sartomer Company under the trade designation "SR 350". When the TMPTMA or other monomer is added to the plastisol, an initiator is also included to initiate the polymerization reaction. Preferably, the initiator is a peroxide initiator such as t-amylperoxy-2-ethyl-hexanoate commercially available under the trade designation "Lupersol" 575P75 from Elf Atochem North America Incorporated of Philadelphia, Pa.

Suitable plasticizers for inclusion within the coating composition include ditridecyl phthalate, epoxidized 2-ethyl hexyl tallate, diundecyl phthalate, dioctyl adipate, and the like. Additional lubricants may also be added to the coating composition. A minor amount of silicone oil such that available under the trade designation "DC-200" available from Dow Corning of Midland, Mich. provides processing advantages in the extrusion process as described below. Heat stabilizers and UV stabilizers may be added in minor amounts to the plastisol to stabilize the outer coating of the fly line. Suitable stabilizers are known to those skilled in the art and include organo barium zinc stabilizer such as that available under the trade designation "SYNDRON-940" available from Ferro Corporation of Schreve, Ohio. A suitable ultraviolet (UV) stabilizer is that available under the trade designation "UVINOL 3039" available from BASF Corporation of Mount Olive, N.J. Ditridecyl phthalate is a preferred nonpolymerizable plasticizer, present optimally at about 25 parts per 100 parts vinyl resin. Epoxidized 2-ethyl hexyl tallate is a plasticizer containing epoxy groups which aid in the heat stabilizing ability of the barium zinc liquid in the plastisol. The plastisol should preferably contain at least about 5 parts (per 100 parts vinyl resin) of this family of epoxy materials. A preferred level of nonpolymerizable plasticizer is on the order of 52 PHR vinyl resin. It will be understood that variations in the level of this and other conventional ingredients are possible and are considered within the scope of the present invention. Other suitable plasticizers may also be apparent to those skilled in the art and the invention is not to be construed as limited to any one or more plasticizers, either used alone or in combination in the coating composition of the present invention.

Teflon powder is added to the plastisol in order to improve the properties of the resulting fly line. With the inclusion of PTFE in the outer coating, it has been found that the fly lines of the invention possess enhanced durability and shootability when compared with fly lines without PTFE. Preferably, the PTFE added to the plastisol is in a fine powder form. One preferred PTFE powder is that known under the trade designation TEFLON MP 1100 available from Du Pont Company of Willmington, Del. In general, the PTFE powder should be of a very small particle size. The aforementioned MP 1100 is known to have an average particle size within the range of 1.8 to 4 micrometers. In general, a range of 1 to 15 micrometers is preferred.

Glass microspheres can be added to the plastisol to impart floatability to the line. Suitable microspheres are commercially available from the Minnesota Mining & Manufacturing Company of St. Paul, Minn. under the trade designation bubble type G18/500. Nominal average particle density of these bubbles is 0.18 grams per cubic centimeter and the isotactic strength of the soda lime borosilicate glass is about 500 p.s.i.

In preparing the plastisol, powdered vinyl resin is first completely dispersed within the plasticizers and other additives (e.g., lubricant, UV stabilizer, heat stabilizer) and charged within a suitably sized reaction vessel, and then mixed and agitated for five minutes until blended. The amount of plasticizer, based on weight of vinyl, should generally be within the range 45 to 55 parts per hundred weight of vinyl. Lubricants and other known additives may be added in amounts sufficient to achieve the desired properties for both the plastisol as well as for the finished coating. Lubricant may be added at a concentration from about 2 to about 4 wt-% based on the weight of the entire plastisol formulation. The vinyl resin may be added and mixed at low speeds until coated with the plastisizers. The resulting paste is then mixed at a higher speed for to continue to disperse the resin within the plasticizer and additive blend to form a uniform base composition. A mixing time of about ten minutes is generally suitable.

The aforementioned PTFE powder may then be added to the base and mixed thoroughly to provide a uniform mix. PTFE is typically added to the plastisol at a concentration within the range from 1 to 10% by weight based on the weight of the aforementioned base, and preferably within the range from 2 to 5%. The TMPTMA or other acrylic monomer may be added to the plastisol blend and mixed at a medium speed for suitable period of time (e.g., 20 minutes). Acrylic monomer is added to the plastisol at a concentration within the range 2 to 4% by weight based on the total weight of the plastisol.

The plastisol may be held at this point until needed for coating at which time initiator, glass microspheres and pigments may be added to the mixture and deaerated under vacuum to remove trapped air in the plastisol. Initiators are preferably added at the end of the process to minimize the possibility of early polymerization of the monomer prior to coating. Typically, initiator is added to achieve a level of about 1.5% by weight based on the weight of the acrylic monomer. Glass microspheres may be added to achieve a concentration in the plastisol of between about 4 and about 8% by weight based on the total weight of the plastisol. Pigment is added in an amount sufficient to achieve a desired color, typically at a concentration between about 1 and about 8 wt-% based on the weight of the plastisol.

The thus prepared plastisol is applied to the fly line core preferably by passing the core through a primer tank to apply primer to the core and thereby promote improved adhesion of the outer coating to the core surface. The primed core is heated to a suitable temperature (e.g., about 350° F.) to drive off solvents and remove absorbed water from the core. The core is then dipped into a suitable tank or the like containing the plastisol and then brought through a variable orifice wipe die to shape the coating diameter and give the line its proper taper configuration. The coating line is run vertically under low tension (about 1 to 5 p.s.i.) through a forced air oven to fuse the vinyl and polymerize the acrylic monomer, if present. A line speed of 7 to 15 feet per minute with an oven temperature of about 380° F. is suitable. The line can be air cooled during its return to coiling skeins prior to repackaging into finished lines.

The thus prepared outer coating provides a fly fishing line having a desired combination of properties. Most notably, the inventive coating of the present invention provides a fly line with improved shootability and durability. Floatability and memory may also be enhanced with the inclusion of the acrylic polymer in the line and with microspheres or the like for floatability. Improved shootability and durability is seen with the incorporation of the PTFE within the vinyl coating. Shootability translates into a property resulting in longer accurate casts while durability provides a line that lasts longer under normal use. Inclusion of the PTFE provides the lines of the invention lines with improved hydrophobicity and better resistance to icing in cold weather casting. Shootability and durability may be further enhanced by the incorporation of the acrylic polymer within the line, with the resulting three dimensional polymer network within the plasticized vinyl coating increasing the stiffness of the line while retaining its integrity. The increased stiffness results from the polymerization process with the line partially stretched in a straight configuration during its processing. The polymer network is in its lowest energy state when the line is straight. At warmer temperatures, the line will readily straighten when taken off the reel. At cooler temperatures, memory may be somewhat more difficult to remove from the line, requiring several casts to eliminate the coil of the line resulting from its storage on the reel.

The features of the present invention will be further illustrated in the non-limiting examples set forth below. In the examples, all concentrations are in parts by weight unless otherwise indicated.

EXAMPLES

Procedure A (fly line manufacture)

Fly lines were manufactured by preparing a plastisol base composition with the ingredients shown in Tables 1 and 2. A core was used comprised of braided nylon multifilaments. A base composition is first prepared as either Plastisol Formulation A or as Plastisol Formulation B as shown in Tables 1 and 2, respectively. The Plastisol Formulations A and B were prepared by dispersing the vinyl resin within the plasticizers and other additives (e.g., lubricant, UV stabilizer, heat stabilizer) in a suitably sized reaction vessel, and then mixed and agitated for five minutes until blended. The vinyl resin was added and mixed at a low speed until it appeared to be fully coated with plasticizer. The resulting paste was mixed at a higher speed for about 10 minutes to further disperse the resin within the plasticizer and additive blend to form the Plastisol Formulations A and B.

The Plastisol Formulations were used to make the fly lines of the examples with additional ingredients (e.g., PTFE powder, glass microspheres, TMPTMA monomer, etc.) added to the base as indicated in the individual examples prior to coating the plastisol onto the core line. The fly line core was first passed through a primer tank to add primer ("Morthane CA-100" primer from Morton Thiokol") to the core to improve adhesion of the outer coating to the core surface. The primed core was heated to 350° F. to dry off all solvents within the primer and remove absorbed water from the core. The core was dipped into a pan containing the plastisol and then brought through a variable orifice wipe die to shape the coating diameter and give the line a desired configuration. The coated line was run vertically under low tension (about 1 to 5 p.s.i.) through a forced air oven at a speed from about 7 to 15 feet per minute line speed and at an oven temperature of 380° F. to fuse the vinyl. The lines were air cooled to a non-tacky state for at least 24 hours prior to testing.

TABLE 1

| Plastisol Formulation A | | | |
|---|---|---|---|
| Component | Trade Designation | PHR | Function |
| polyvinyl chloride | Geon 121 (B F Goodrich) | 100 | vinyl resin |
| ditridecyl phthalate | Plasthall DTDP | 16 | plasticizer |
| epoxidized 2-ethyl hexyl tallate | Monoplex S-73 | 26 | plasticizer |
| diundecyl phthalate | DUP | 12 | plasticizer |

TABLE 1-continued

Plastisol Formulation A

| Component | Trade Designation | PHR | Function |
|---|---|---|---|
| silicone oil | DC-200 | 5 | lubricant |
| organo barium zinc stabilizer | SYN-940 | 2 | heat stabilizer |
| UV absorber | Univol 3039 | 0.8 | UV stabilizer |

TABLE 2

Plastisol Formulation B

| Component | Trade Designation | PHR | Function |
|---|---|---|---|
| polyvinyl chloride | Geon 121 (B F Goodrich) | 100 | vinyl resin |
| dioctyl adipate | DOA | 14 | plasticizer |
| epoxidized 2-ethyl hexyl tallate | Monoplex S-73 | 16 | plasticizer |
| diundecyl phthalate | DUP | 25 | plasticizer |
| silicone oil | DC-200 | 5 | lubricant |
| organo barium zinc stabilizer | SYN-940 | 2 | heat stabilizer |
| UV absorber | Univol 3039 | 0.8 | UV stabilizer |

Test Procedure A (Durability)

Fly line durability was tested on a test apparatus comprised of a rotating disc or reel capable of cycling a section (21 inches) of a fly line through a fly rod tip at 2500 cycles per hour. One end of the line is attached to the aforementioned disc and the other end of the line is attached to a 50 gram weight. 10,000 cycles correlates with about 100 hours of line use.

Test Procedure B (Shootability)

Distance data was collected by having seven people cast test lines using identical fly rods. The lines used were all marked at 42 feet from the leading end of the line. A leader was attached to the lines and each line was cast three times. The distance from the marked line after casting to the tip of the rod was measured for each cast. Three casts were averaged for each line.

Example 1

A line was made using 29.51 kg of Plastisol Formulation A to which was added 205 grams glass microspheres (commercially from Minnesota Mining and Manufacturing Company, St. Paul Minn., under the trade designation G18/500), 55 grams of additional epoxidized 2-ethyl hexyl tallate plasticizer (Monoplex S-73), 56 grams of fluorochemical for improved hydrophobicity (commercially available from Minnesota Mining and Manufacturing Company, St. Paul Minn. under the trade designation FC-3537) and 81.7 grams of PTFE (commercially obtained from DuPont Company under the trade designation "MP-1100").

Example 2

A line was made using 29.51 kg of Plastisol Formulation A to which was added 205 grams glass microspheres (commercially from Minnesota Mining and Manufacturing Company, St. Paul Minn., under the trade designation G18/500) and 79 grams of PTFE (commercially obtained from DuPont Company under the trade designation "MP-1100").

Example 3

A line was made using 29.51 kg of Plastisol Formulation A to which was added 205 grams glass microspheres (commercially from Minnesota Mining and Manufacturing Company, St. Paul Minn., under the trade designation G18/500), 55 grams of additional epoxidized 2-ethyl hexyl tallate plasticizer (Monoplex S-73) 92 grams of TMPTMA (commercially available from Sartomer Company under the trade designation "SR 350") and 97.5 grams of PTFE (commercially obtained from DuPont Company under the trade designation "MP-1100").

Example 4

A line was made using 29.51 kg of Plastisol Formulation B to which was added 205 grams glass microspheres (commercially from Minnesota Mining and Manufacturing Company, St. Paul Minn., under the trade designation G18/500), 56 grams of fluorochemical for improved hydrophobicity (commercially available from Minnesota Mining and Manufacturing Company, St. Paul Minn. under the trade designation FC-3537) and 80.3 grams of PTFE (commercially obtained from DuPont Company under the trade designation "MP-1100").

Comparative Example A

A comparative test line was prepared as in Example 1 but without the added PTFE.

Comparative Example B

A comparative test line was prepared as in Example 2 but without the added PTFE.

Comparative Example C

A comparative test line was prepared as in Example 3 but without the added PTFE.

Comparative Example D

A comparative test line was prepared as in Example 4 but without the added PTFE.

Comparative Example E

This comparative line is a commercially available fly line available from Fly Fishing Technology Ltd., Wales, United Kingdom, under the trade designation "Airflo Ts". The line is comprised of a nylon monofiber core with an outer coating comprised of a polyester urethane with rosin ester and PTFE.

Comparative Example F

This line is similar to that of Comparative Example E in that it is also commercially available fly line available from Fly Fishing Technology Ltd., Wales, United Kingdom, under the trade designation "Airflo Ti". The line is comprised of a nylon monofiber core with an outer coating comprised of a polyester urethane with rosin ester but without PTFE.

Examples 1–4 and Comparative Examples A–F

Comparative testing was conducted according to Test Procedure A to determine durability for each of the lines of Examples 1–4 and Comparative Examples A–F. The durability data is presented in Table 3. The data indicates surprising and unexpected high durability values for the inventive lines of Examples 1–4, all of which include PTFE in their outer coatings. Comparison of the durability of Examples 1, 2, 3, 4 with Comparative Examples A, B, C, D, respectively, shows large gains in the durability of the lines with PTFE in the outer coating of the line. Also surprising was the relatively low durability for Comparative Example E even though this line was known to include PTFE in its outer coating. Durability for Comparative Example E was even lower than that for Comparative Example F which is similar in composition to Comparative E but without added PTFE.

TABLE 3

| Example | Durability |
|---------|-----------|
| 1 | 29,000 |
| 2 | 61,400 |
| 3 | 46,000 |
| 4 | 65,000 |
| C. Ex. E | 4,000 |
| C. Ex. A | 16,000 |
| C. Ex. B | 5,000 |
| C. Ex. C | 29,000 |
| C. Ex. D | 42,000 |
| C. Ex. F | 9,000 |

Example 3 and Comparative Example C

The fly lines of Example 3 and Comparative Example C were also compared for shootability according to Test Procedure B. Although the test may be somewhat subjective, this comparison showed a distance of 10.55 feet for the line of Example 3 and a distance of 8.5 feet for the line of Comparative Example C.

Although the preferred embodiment of the present invention has been described in detail, it may be possible that modifications to the described embodiment may be made by those skilled in the art without departing from the spirit and scope of the invention as is further set forth in the appended claims.

What is claimed is:

1. A method of making a fly fishing line comprising:
   (a) preparing a plastisol by mixing a polyvinyl chloride resin with polytetrafluoroethylene,
   (b) coating a core with the plastisol, and
   (c) exposing the plastisol to conditions providing formation of a coating.

2. The method of claim 1 wherein the plastisol further comprises a polyfunctional polymerizable acrylate monomer and an initiator.

3. The method of claim 2 wherein the polymerizable acrylate monomer is selected from the group consisting of trimethylol propane trimethacrylate, tetraethylene glycol diacrylate, 1,6 hexanediol dimethacrylate and combinations of the foregoing.

4. The method of claim 1 wherein the plastisol further comprises plasticizers selected from the group consisting of ditridecyl phthalate, epoxidized 2-ethyl hexyl tallate, diundecyl phthalate, dioctyl adipate, and combinations of the foregoing.

5. The method of claim 1 wherein the plastisol further comprises silicone oil.

6. The method of claim 1 wherein the plastisol further comprises at least one heat stabilizer.

7. The method of claim 1 wherein the plastisol further comprises at least one UV stabilizer.

8. The method of claim 1 wherein the method further comprises applying a primer to the core prior to coating the core with the plastisol to improve adhesion of the coating to the core surface.

9. A fly fishing line made by the method of any one of claim 1, through 8.

10. A fly fishing line comprising:
    a core; and
    a coating disposed around the core, the coating comprising a blend of polyvinyl chloride polymer and polytetrafluoroethylene.

11. The fly fishing line of claim 10, wherein the coating further comprises polyacrylate.

12. The fly fishing line of claim 11, wherein the polyacrylate is a polymerized reaction product of a polyfunctional polymerizable acrylate monomer selected from the group consisting of trimethylol propane trimethacrylate, tetraethylene glycol diacrylate, 1,6 hexanediol dimethacrylate and combinations of the foregoing.

13. The fly fishing line of claim 10, wherein the polytetraflyoroethylene is in particulate form having an average particle size within the range from about 1 micrometer to about 15 micrometers and the outer coating is adhered to the core.

14. The fly fishing line of claim 10, wherein the core comprises at least one strand of monofilament.

15. The fly fishing line of claim 10 wherein the core comprises at least one strand of braided monofilament.

16. The fly fishing line of claim 10, wherein the coating further comprises glass microspheres.

17. The fly fishing line of claim 10 wherein the polytetrafluoroethylene is dispersed throughout the coating.

* * * * *

UNITED STATES PATENT AND TRADEMARK OFFICE
CERTIFICATE OF CORRECTION

PATENT NO. : 6,321,483 B1
DATED : November 27, 2001
INVENTOR(S) : Del A. Kauss and Bruce W. Richards It is certified that error appears in the above-identified patent and that said Letters Patent is hereby corrected as shown below:

Column 10,
Line 20, delete "claim 1," and insert in place thereof -- claims 1 --.

Signed and Sealed this

Fourth Day of June, 2002

*Attest:*

*Attesting Officer*

JAMES E. ROGAN
*Director of the United States Patent and Trademark Office*